Dec. 7, 1926.
C. E. KRATSCH
1,610,137
CONNECTING ROD
Filed Jan. 28, 1926
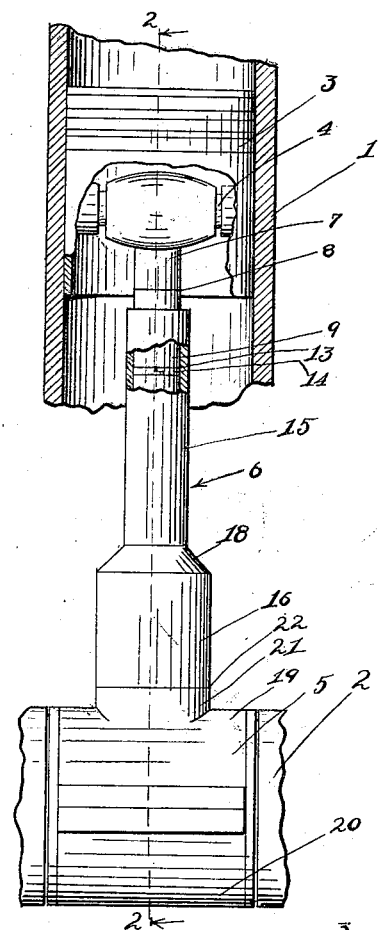
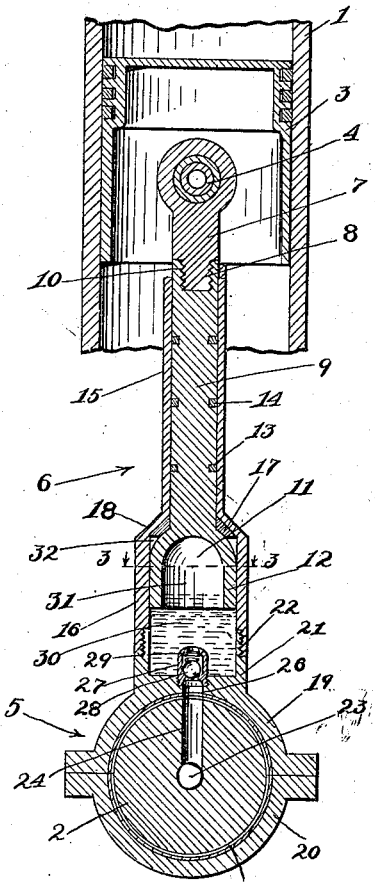
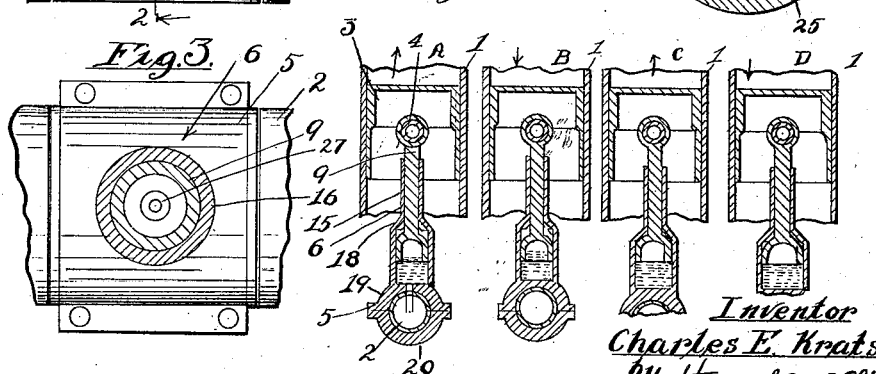
Inventor
Charles E. Kratsch.
by Hazard and Miller
Attorneys Patented Dec. 7, 1926.

1,610,137

UNITED STATES PATENT OFFICE.

CHARLES E. KRATSCH, OF LOS ANGELES, CALIFORNIA.

CONNECTING ROD.

Application filed January 28, 1926. Serial No. 84,332.

My invention is a connecting rod preferably for an internal combustion engine and in the mechanical method of driving a crank from a piston.

An object of my invention is to form an extensible connecting rod so designed that it may give slightly on the impulse of the top of the piston and thereby lessen the jar on the connecting rod on the explosion.

Another object of my invention is to employ a hydraulic system under a more or less constant pressure for taking up the thrust due to the explosion, this hydraulic arrangement being incorporated in the connecting rod.

A particular object of my invention is in the formation of a connecting rod having a hydraulic chamber with an air bell therein, the bell being thrust into the hydraulic liquid on the explosive stroke of the engine and thereby compressing the air and hence reducing the direct shock on the crank.

As to my mechanical method, this comprises rotating a crank from a reciprocating piston by transmitting a force giving a torque to the crank shaft, the transmitted force being yielding on a first impulse such as the explosion and communicating an extended force before the piston starts on its return stroke.

In the construction of my connecting rod I connect a central rod section to the wrist pin of a piston, this rod having a bell in the opposite end. A sleeve is slidably mounted on the rod and attached to the journal cap of the crank shaft, the cap and the lower end of the sleeve being formed with a hydraulic chamber therein adapted to contain oil. The oil is fed to said chamber through the lubricating system of the engine being conducted under pressure, through the crank and by means of grooves in the connecting rod cap to the hydraulic chamber.

My invention will be more readily understood from the following description and drawings, in which;

Figure 1 is an elevation of my connecting rod.

Fig. 2 is a section on the line 2—2 of Fig. 1, in the direction of the arrows.

Fig. 3 is a cross section on the line 3—3 of Fig. 2, in the direction of the arrows.

Fig. 4 is a series of diagrams indicating the action of the extensible connecting rod on the compression, explosion, exhaust and suction stroke of an engine.

In the drawings, a portion of a cylinder is indicated by the numeral 1 and a portion of a crank shaft by the numeral 2. The piston 3 reciprocates in the cylinder having a wrist pin 4. The crank has a bearing 5 attached thereto with my improved connecting rod designated generally by the numeral 6 transmitting the reciprocating motion of the piston to a rotary motion of a crank.

I preferably form the connecting rod in several sections, the details being shown particularly in Figs. 1, 2 and 3. A wrist pin stub 7 connects to the wrist pin and has a screw threaded projection 8. A rod 9 having a threaded socket 10 is secured to the projection 8. This rod is provided with a bell or cup 11 at its lower end. The rod is formed cylindrical and the skirt 12 of the bell is formed cylindrical. The rod has annular grooves 13 in which are fitted expansion rings 14 similar to piston rings and having a similar function of preventing the longitudinal flow of oil as hereunder explained.

A sleeve 15 is slidably mounted on the rod, the sleeve having an enlarged section 16 engaging the skirt 12, so proportioned for the skirt 12 to slide therein. Abutment blocks 17 are secured at the enlargement 18 of the sleeve, functioning as hereunder explained. The bearing 5 has a cap section 19 and a lower section 20, these being connected together in the usual manner. The cap is provided with a cup 21 having a screw threaded end engaging the enlarged section 16 of the sleeve as indicated by the numeral 22.

The crank is provided with the usual oiling bore 23 having a radial duct 24 leading to its periphery and the bearing may have a bushing provided with an annular groove 25. A short oil port 26 leads upwardly through the cap 19 from the groove 25 into the cup 21. A check valve 27 indicated as having a ball 28 with a cage 29 forms the outlet of the port 26 into the cup.

The above construction forms an oil chamber 30; this being partially in the cup 21 and in the enlargement 16 of the sleeve and an air chamber 31 is formed in the bell 11. A certain amount of oil is squeezed past the skirt 12 and accumulates in the space 32 above the bell but as the skirt and the enlargement 16 do not have a tight fit this oil will work backwards and forwards. A certain amount of oil will be forced up the rod 9 but most of this will be retarded by the expansion rings so that there will not be a discharge of oil between the sleeve 15 and the rod 9.

In the operation of the engine, this being preferably by an internal combustion engine, it will readily be seen that on the explosion stroke, when the piston is driven downwardly the rod 9 will be thrust downwardly relative to the sleeve and hence the bell 11 may become immersed in the oil, thereby pressing the air in the bell. This reduces the direct shock of the explosion as transmitted from the piston to the crank and near the end of the explosion stroke, the air being under very high pressure expands and gives a further impulse to the rotation of the crank.

The operation as it takes place in a four cycle internal combustion engine is substantially as follows, being represented in Fig. 4:

The diagram A represents the compression stroke in which the piston is being forced up by the crank as indicated by the arrow and compressing a gas in the cylinder. This compressed gas forced the rod 9 downwardly, thrusting the bell into the oil to a certain extent.

The diagram B represents the explosion stroke in which there is a strong and sudden pressure on the piston, thus thrusting the bell down to a further extent in the oil and compressing the air to a greater extent.

The diagram C represents the exhaust stroke with the piston being thrust upwardly by the crank and as there is very little back pressure on the piston the abutment blocks 17 will be in engagement or in substantial engagement with the outside of the bell.

Diagram D represents the suction stroke with which the piston is pulled downwardly by the crank, the bell being brought into close engagement with the abutment blocks 17 so that the sleeve draws the rod 9.

From the above description it is believed that the operation of my cushioning type of connecting rod will be apparent. It is obvious that such connecting rod may be utilized in other types of engines such as steam or other gas engines. Moreover, the same type of connecting rod may be utilized in a reverse manner in which a rotating crank is used to pump a liquid or gaseous fluid.

My invention from the aspect of a method comprises transmitting a force from a reciprocating piston by reciprocating motion; this being changed into a rotary motion by the crank and the jar of the impulse of the explosion stroke being minimized by compressing a gas or other compressible medium,
a further portion of the explosion stroke allowing the compressed gaseous or other fluid to give the crank a rotary impulse.

It will be apparent from the above description that the oiling system of the engine when of a compression or forced feed type will continuously force oil through the crank and into the groove in the bearing 5 and hence into the oil chamber 30, the check valve 27 preventing back flow of the oil due to its compression by the bell on the end of the rod 9.

It will be apparent that the general design and specific details of my connecting rod may be considerably changed to adapt it to different types of engines and also that changes may be made in incorporating it in the ordinary type of internal combustion engine. Substantially the same type would be suitable for a two stroke engine or for engines having different stroke cycles.

Such changes would be within the spirit of my invention as set forth in the description, drawings and claims.

Having described my invention, what I claim is:

1. In combination a piston, a crank, a connecting rod between same, the connecting rod having a plurality of slidable elements, one of said elements having an oil chamber and the other having a bell whereby the bell is immersed in the oil chamber in one direction of movement of the piston relative to the crank.

2. In combination a piston, a connecting rod having a bell at one end connected thereto, a crank having a bearing, a sleeve connected to the bearing, the sleeve being slidable on the rod and having an oil chamber adjacent the crank.

3. In combination a piston as claimed in claim 2, having in addition an oil duct leading through the bearing into the oil chamber.

4. In combination a piston having a wrist pin, a wrist pin stub connected thereto, a rod connected to the stub, a bell formed on the opposite end of the rod, a crank having a bearing thereon, a cap forming part of the bearing, a sleeve connected to the cap, the sleeve having an enlarged end forming an oil chamber and a reduced portion slidable on the rod, and means to feed oil from the crank to the oil chamber.

5. In combination a piston as claimed in claim 4, having in addition abutment blocks on the sleeve adapted to engage the bell.

6. In combination a piston as claimed in claim 4, having in addition a check valve in the oil chamber to prevent back flow of oil to the crank.

7. A connecting rod comprising in combination a rod having oil retaining means thereon, a cup formed at one end of the rod, means adapted to connect the other end of the rod to a wrist pin, a sleeve slidable on the rod having an enlarged end, the enlarged end having a sliding fit with the bell, a cap adapted to form a part of a bearing adapted to be attached to a crank and means connecting the sleeve and the cap, the cap and the enlargement of the sleeve forming an oil chamber.

8. A connecting rod as claimed in claim 7, having in addition an oil duct through the cap and a check valve in the oil chamber.

In testimony whereof I have signed my name to this specification.

CHAS. E. KRATSCH.